United States Patent
Paganini et al.

(10) Patent No.: US 12,250,945 B2
(45) Date of Patent: Mar. 18, 2025

(54) OIL-BASED DRIFT CONTROL COMPOSITIONS

(71) Applicant: Lamberti SPA, Albizzate (IT)

(72) Inventors: Gianfranco Paganini, Conroe, TX (US); Bradley Eidem, Spring, TX (US); Federico De Pellegrini, Albizate (IT); Andrea Brayton, Vernon Hills, IL (US)

(73) Assignee: Lamberti SPA, Albizzate (IT)

( * ) Notice: Subject to any disclaimer, the term of this patent is extended or adjusted under 35 U.S.C. 154(b) by 0 days.

(21) Appl. No.: 18/014,679

(22) PCT Filed: Jul. 26, 2021

(86) PCT No.: PCT/EP2021/070838
§ 371 (c)(1),
(2) Date: Jan. 5, 2023

(87) PCT Pub. No.: WO2022/023255
PCT Pub. Date: Feb. 3, 2022

(65) Prior Publication Data
US 2023/0189798 A1    Jun. 22, 2023

(30) Foreign Application Priority Data
Jul. 29, 2020  (IT) .................. 102020000018364

(51) Int. Cl.
| | | |
|---|---|---|
| *A01N 25/24* | (2006.01) | |
| *A01N 25/30* | (2006.01) | |
| *A01N 57/20* | (2006.01) | |
| *A01P 13/00* | (2006.01) | |

(52) U.S. Cl.
CPC ............ *A01N 25/24* (2013.01); *A01N 25/30* (2013.01); *A01N 57/20* (2013.01); *A01P 13/00* (2021.08)

(58) Field of Classification Search
CPC ........ A01N 25/24; A01N 25/30; A01N 57/20; A01N 35/10; A01N 37/40; A01N 39/04; A01N 39/00; A01P 13/00
USPC .......................................... 504/206
See application file for complete search history.

(56) References Cited

U.S. PATENT DOCUMENTS

| | | |
|---|---|---|
| 8,809,234 B1 | 8/2014 | Parrish |
| 2018/0184647 A1* | 7/2018 | Bissell ................. A01N 25/30 |

FOREIGN PATENT DOCUMENTS

| | | | |
|---|---|---|---|
| EP | 3064062 A1 | 9/2016 | |
| RU | 2621557 C2 * | 6/2017 | ............ A01N 25/02 |
| WO | 2013098220 A1 | 7/2013 | |
| WO | WO-2019038102 A1 * | 2/2019 | ............ A01N 25/30 |

OTHER PUBLICATIONS

By Med Chem Express (https://www.medchemexpress.com/polyoxyethylene-sorbitan-monostearate.html 2024) (Year: 2024).*
International Search Report for PCT/EP2021/070838 dated Sep. 11, 2021.
Written Opinion of the Ministero dello Sviluppo Economico for IT202000018364 dated Jul. 29, 2020.

* cited by examiner

*Primary Examiner* — Anna R Falkowitz
(74) *Attorney, Agent, or Firm* — Vorys, Sater, Seymour and Pease, LLP

(57) ABSTRACT

Oil-based drift control compositions for pesticide or crop protection formulations, that comprise an oil phase, a water soluble polymer, at least one ethoxylated esteramine, at least one alkylbenzene sulfonate and at least one alkyl, aryl or alkylaryl ether phosphate, are readily emulsifiable and are able to maintain the efficacy of agricultural active ingredients applied together with said composition.

8 Claims, No Drawings

OIL-BASED DRIFT CONTROL COMPOSITIONS

TECHNICAL FIELD

The present invention relates to an oil-based anti-drift composition, i.e. with spray drift control properties, comprising an oil phase, a drift control agent and a specific blend of surfactants.

BACKGROUND ART

In the agrochemical industry, formulations of agriculturally-active compounds are often sprayed, normally after dilution in an aqueous spray liquid, onto plants and/or their habitat. When applying such formulations, a more or less pronounced drifting of the spray solution containing the active substances may be observed.

Spray drift is sprayed material that misses the target during application.

Spray drift represents a restriction factor that causes an inefficient and off target application and reduces the overall efficiency of pesticide treatments, increasing their costs. It also increases the impact of chemicals on the environment and can adversely affect non-target plants.

Moreover, spray drift can pollute adjacent water-courses, groundwater, landscapes, and woodland. Drift can bring the applicator and members of the public into increased contact with potentially harmful or unpleasant chemicals.

Spray drift is caused by a combination of factors such as wind speed, local atmospheric conditions, nozzle choice, sprayer pressure, vehicle speed, boom height and chemical factors.

Previous research has focused on reducing spray drift by altering the sprayer features, such as nozzles and pressure of the sprayer and by using spray adjuvants, such as drift control agents to optimize droplet size distribution reducing the smallest droplets and limiting the increasing of coarser ones.

The drift control agents (or anti-drift agents) change the viscoelastic properties of the spray liquid, more specifically by reducing its stretching capability (elongational viscosity) and its tendency to separate into smaller droplets. These factors result in a spray with a reduced percentage of smaller droplets, i.e. those having a diameter below 150 microns.

One of the most commonly used drift control agents is represented by guar gum with its derivatives, which are traditionally added as a solid additive to an aqueous agrochemical spray medium. However, the aqueous hydration of solid, water-soluble polymers such as guar gum or its derivatives in an aqueous agrochemical spray medium in order to realize drift reduction properties can often be an arduous and frustrating task for the end-user. Insufficient dispersion of powdered guar gum, caused most often by the too rapid addition of the powder to the aqueous medium or insufficient agitation of the medium during the addition process, often results in agglomeration or lumps. The formation of lumps can result in difficulty in spraying and loss of drift control, causing a lowering of the overall concentration of dissolved guar gum in the spray medium and therefore a reduced drift control. In addition, the aqueous medium will not flow or be readily pumpable, with risk of plugging the spray nozzle holes.

In order to overcome the disadvantages associated with the use of water-based guar containing drift control compositions, the preparation of oil-based guar containing drift control compositions represents a promising solution. Oil-based drift control compositions can be particularly advantageous because they impart chemical stability to water sensitive actives, they are an efficient way to deliver oil adjuvancy and they can assist in dispersing difficult-to-disperse materials into water.

U.S. Pat. No. 6,939,555 discloses a homogenous agrochemical composition containing at least one fertilizer or oil and at least one natural gum as deposition agent.

Compositions similar to those described in U.S. Pat. No. 6,939,555, however, show propensity to settle on standing, as reported by Halecky, A., Roberts, J., Penfield, K., and Baker, T., "Evaluation of a Modified Guar OD Formulation for Spray Drift Mitigation" Journal of ASTM International, Vol. 8, No. 10, 2011, pp. 1-13.

AU 2013206347 discloses an oil-based liquid concentrate comprising: a) about 0.01 to about 15% w/w of a drift control agent; b) 56 to about 75% w/w of an oil selected from vegetable oils, paraffins, mineral and synthetic oils or mixtures thereof; and c) about 1 to about 5% w/w of a dispersing agent.

WO 2018/126017 relates to a drift reduction adjuvant composition comprising water, guar gum, a polyoxyethylene sorbitan emulsifier and a seed oil.

US 2013/0123104 discloses an agrochemical adjuvant composition that includes (a) one or more first nonionic surfactants selected from the group consisting of fatty acid glycol ester surfactants, polyalkoxylated triglyceride surfactants, alkoxylated fatty alcohol surfactants, and sorbitan fatty acid ester surfactants, (b) at least one of: (b)(i) one or more second nonionic surfactants selected from the group consisting of polyalkoxylated alkylphenol surfactants, polyalkoxylated alkarylphenol surfactants, amine oxide surfactants, alkanolamide surfactants, glycoside surfactants, and ethylene/propylene oxide block copolymers, and (b)(ii) one or more anionic components selected from the group consisting of anionic surfactants and polyanionic polymers, (c) optionally, a liquid medium comprising one or more fatty acid ($C_1$-$C_3$)alkyl esters, (d) optionally, one or more water soluble deposition aid polymers, and (e) optionally, one or more thickening agents.

Despite oil-based drift control compositions have been described, the need still exists in the art to provide alternative, stable, oil-based compositions containing polymeric drift control agents, which are readily emulsifiable and are able to maintain the efficacy of agricultural active ingredients applied together with said composition.

The composition here below described meets this need.

SUMMARY

It is therefore an object of the present invention an oil-based drift control composition comprising:
  a) from 40 to 80% by weight (wt %) of an oil phase;
  b) from 1 to 15 wt % of a water soluble polymer as drift reducing agent;
  c) from 5 to 20 wt % of at least one ethoxylated esteramine of formula I:

$$\underset{R''}{\overset{Y\diagdown_{R'}}{\underset{|}{Z\diagup\phantom{R''}\diagdown N\diagdown_{R}\diagup X}}}\qquad\text{I}$$

wherein:
R, R' and R" are each independently alkylene group having from 1 to 8 carbon atoms, preferably from 2 to 4, more preferably 2 carbon atoms;
X, Y and Z are selected among H, O—$(CH_2CH_2O)_n$H, O—$(CH_2CH_2O)_n$—COR''' or O—COR''' and one of X, Y and Z is O—$(CH_2CH_2O)_n$—COR''' or O—COR''';
wherein n=1-10, and preferably n=2-5;
R''' is a saturated or unsaturated $C_6$-$C_{30}$ alkyl group, provided that:
i) when one among X, Y or Z is O—$(CH_2CH_2O)_n$—COR''', the other two substituents are each independently H or O—$(CH_2CH_2O)_n$H
ii) when one among X,Y or Z is O—COR''', the other two substituents are H or O—$(CH_2CH_2O)_n$H and at least one of them is O—$(CH_2CH_2O)_n$H;
d) from 3 to 10 wt % of at least one alkylbenzene sulfonate;
e) from 0.5 to 5 wt % of at least one alkyl, aryl or alkylaryl ether phosphate;
f) from 0 to 15 wt % of water.

It is another object of the present invention a method for reducing spray drift during spray application of a pesticide or crop protection formulation that comprises tank mixing the formulation with an oil-based drift control composition composition comprising:
a) from 40 to 80% by weight (wt %) of an oil phase;
b) from 1 to 15 wt % of a water soluble polymer as drift reducing agent;
c) from 5 to 20 wt % of at least one ethoxylated esteramine of formula I:

$$Z\underset{R''}{\diagdown}\underset{|}{\overset{\overset{\displaystyle Y}{|}\overset{\displaystyle R'}{}}{N}}\underset{R}{\diagup}X \qquad I$$

wherein:
R, R' and R" are each independently alkylene group having from 1 to 8 carbon atoms, preferably from 2 to 4, more preferably 2 carbon atoms;
X, Y and Z are selected among H, O—$(CH_2CH_2O)_n$H, O—$(CH_2CH_2O)_n$—COR''' or O—COR''' and one of X, Y and Z is O—$(CH_2CH_2O)_n$—COR''' or O—COR''';
wherein n=1-10, and preferably n=2-5;
and R''' is a saturated or unsaturated $C_6$-$C_{30}$ alkyl group,
provided that:
i) when one among X, Y or Z is O—$(CH_2CH_2O)_n$—COR''', the other two substituents are each independently H or O—$(CH_2CH_2O)_n$H
ii) when one among X,Y or Z is O—COR''', the other two substituents are H or O—$(CH_2CH_2O)_n$H and at least one of them is O—$(CH_2CH_2O)_n$H;
d) from 3 to 10 wt % of at least one alkylbenzene sulfonate;
e) from 0.5 to 5 wt % of at least one alkyl, aryl or alkylaryl ether phosphate;
f) from 0 to 15 wt % of water;
spraying on the field the formulation mixed with the drift-control composition.

DETAILED DESCRIPTION

Preferably, the oil-based drift control composition of the present invention comprises:
a) from 50 to 70% by weight (wt %) of oil phase;
b) from 1.5 to 10 wt %, of water soluble polymer as drift reducing agent;
c) from 10 to 15 wt % of at least one ethoxylated esteramine of formula I;
d) from 3 to 8 wt % of at least one alkylbenzene sulfonate;
e) from 1 to 3 wt % of at least one alkyl, aryl or alkylaryl ether phosphate;
f) from 0 to 9 wt % of water.

According to this preferred embodiment, the method of the present invention is a method for reducing spray drift during spray application on field of a pesticide or crop protection formulation which comprises tank mixing the formulation with an oil-based drift control composition comprising:
a) from 50 to 70 wt % of oil phase;
b) from 1.5 to 10 wt % of water soluble polymer as drift reducing agent;
c) from 10 to 15 wt % of at least one ethoxylated esteramine of formula I;
d) from 3 to 8 wt % of at least one alkylbenzene sulfonate;
e) from 1 to 3 wt % of at least one alkyl, aryl or alkylaryl ether phosphate;
f) from 0 to 9 wt % of water.

The oil phase according to the invention is a water-insoluble, liquid organic medium and may be (but is not limited to) any of those oils commonly used in the trade for making oil-based compositions for agricultural use. Suitable oils in the compositions of the invention are, for example:

Vegetable oils such as liquid triglycerides for example olive oil, kapok oil, castor oil, papaya oil, camellia oil, palm oil, sesame oil, corn oil, rice bran oil, peanut oil, cotton seed oil, canola oil, soybean oil, rapeseed oil, linseed oil, tung oil, sunflower oil, safflower oil, and also the transesterification products thereof typically with a $C_1$-$C_4$ alcohol;

linear or branched $C_9$ to $C_{30}$ paraffins having boiling points above 140° C., for example nonane, decane, undecane, dodecane, tridecane, tetradecane, pentadecane, hexadecane, their mixtures, and mixtures thereof with higher boiling homologs, such as hepta-, octa-, nona-decane, eicosane, heneicosane, docosane, tricosane, tetracosane, pentacosane, and the branched chain isomers thereof;

$C_7$- to $C_{18}$-aromatic or cycloaliphatic hydrocarbons, which may be unsubstituted or substituted, such as mono- or polyalkyl-substituted benzenes, or mono- or polyalkyl-substituted naphthalenes;

animal oils, such as whale oil, cod-liver oil and mink oil;

liquid esters of $C_1$ to $C_{12}$ monoalcohols or polyols, for example butanol, n-octanol, i-octanol, dodecanol, cyclopentanol, cyclohexanol, cyclooctanol, ethylene glycol, propylene glycol or benzyl alcohol, with $C_2$ to $C_{10}$ carboxylic or polycarboxylic acids, such as caproic acid, capric acid, caprylic acid, pelargonic acid, succinic acid and glutaric acid; or with aromatic carboxylic acids such as benzoic acid, toluic acid, salicylic acid and phthalic acid. Esters which can be used in the oil-based composition of the invention are thus, for example, benzyl acetate, caproic acid ethyl ester, pelargonic acid ethyl ester, benzoic acid methyl or ethyl ester, salicylic acid methyl, propyl, or butyl ester, diesters of phthalic acid with saturated aliphatic or alicyclic $C_1$ to $C_{12}$ alcohols, such as phthalic acid dimethyl ester, dibutyl ester, diisooctyl ester;

liquid amides of $C_1$-$C_5$ amines, alkylamines or alkanolamines with $C_6$-$C_{18}$ carboxylic acids;

mixtures thereof.

Advantageously, the oil phase is obtained from renewable resources.

Preferably it is a vegetable oil or a transesterification product thereof (ester), typically with $C_1$-$C_4$ alcohols, and in particular with methyl alcohol or ethyl alcohol, such as: corn oil, soybean oil, canola oil, sunflower oil or rapeseed oil, or their transesterification products.

More preferably, the oil phase is a vegetable oil methyl or ethyl ester. Most preferably, the oil phase is soybean oil methyl ester or canola oil methyl ester.

The oil-based drift control composition of the invention may contain from 0 to 15 wt % of water. Preferably, it contains form 0 to 9 wt % of water, more preferably from 1 to 4 wt % of water.

In another embodiment, the oil-based drift control composition of the invention does not contain water.

According to the invention, in the oil-based drift control composition, suitable water-soluble polymers include polyacrylamide, various polysaccharides and derivatives thereof.

"Polysaccharide" as used herein means a polymer comprising a plurality of monosaccharides (sugar units), typically pentose and/or hexose sugar units. The term "polysaccharide" is also meant to include polymers with heteroatoms present in the polysaccharide structure and polymers that comprise different types of sugar units (heteropolysaccharides), for example, polymers that comprise pentose sugar units and hexose sugar units.

"Polysaccharide derivatives" refers to polysaccharides modified by chemical reactions resulting in chemical groups covalently bonded to the polysaccharide, e.g., methyl, ethyl, carboxymethyl, hydroxyethyl, hydroxypropyl, cationic, hydrophobic (i.e. $C_4$-$C_{36}$) alkyl chains, and the like, and mixtures thereof.

According to an embodiment of the invention, when the drift reducing agent is a polysaccharide derivative, it has a degree of substitution (DS) in the range of 0.01-3.0 and/or a molar substitution (MS) comprised between 0.01 and 4.0.

The expression "degree of substitution" (DS) refers to the average number of sites that are substituted with a functional group (e.g. carboxymethyl) per anhydroglycosidic unit in the polysaccharide. Usually each of the anhydroglycosidic units of a polysaccharide contains on the average three available hydroxyl sites. A degree of substitution of three would mean that all of the available hydroxyl sites have been substituted with functional groups.

With the expression "molar substitution" (MS), we mean the number of substituents (e.g., hydroxypropyl) on each anhydroglycosidic unit of the polysaccharide.

Preferably, the water soluble polymer is a polysaccharide or a polysaccharide derivative.

Suitable polysaccharides and derivatives thereof are known in the art and either are commercially available or can be manufactured using methods well known per se in the art.

Non-limitative examples of suitable polysaccharides include polygalactomannans, xanthans, xylans, polyarabinans, polygalactans, chitosan, xyloglucans, pectin, alginate, agar, dextrin, starch, amylose, amylopectin, alternan, gellan, mutan, dextran, pullulan, fructan, gum arabic and carrageenan.

Examples of suitable polygalactomannans are guar gum (guar), locust bean gum, tara gum, cassia gum and sesbania gum. A suitable example of xyloglucan is tamarind gum.

Among the useful polysaccharide derivatives are: cellulose derivatives, such as hydroxyethyl cellulose, ethyl hydroxyethyl cellulose, carboxymethyl cellulose, carboxymethyl hydroxyethyl cellulose, methyl cellulose, ethylcellulose, methyl hydroxypropyl cellulose, carboxymethylmethyl cellulose, hydrophobically modified carboxymethylcellulose, hydrophobically modified hydroxyethyl cellulose, hydrophobically modified hydroxypropyl cellulose, hydrophobically modified methyl cellulose; starch derivatives, including carboxymethyl starch and hydroxypropyl starch.

Guar derivatives that are useful in this preferred embodiment include carboxymethyl guar, hydroxyethyl guar, hydroxypropyl guar, carboxymethylhydroxypropyl guar, cationic guar, cationic hydroxypropyl guar, hydrophobically modified guar, hydrophobically modified carboxymethyl guar, hydrophobically modified hydroxyethyl guar, hydrophobically modified hydroxypropyl guar, cationic hydrophobically modified hydroxypropyl guar, hydrophobically modified carboxymethylhydroxypropyl guar, hydrophobically modified cationic guar.

Other polysaccharides may be similarly derivatized and used as the drift reducing agent.

According to a preferred embodiment of the invention, the water-soluble polymers is guar gum, tamarind gum or a derivative thereof.

More advantageously, the water soluble polymer is guar gum or a derivative thereof, in particular hydroxypropyl guar, and most preferably it is guar gum.

Ethoxylated esteramines of formula I have already been described in WO 2019/038102, but only for use as adjuvants in aqueous based, concentrated or diluted, herbicide formulations.

It has now surprisingly been found that the ethoxylated esteramines of formula I with n=1-10 are also suitable for the preparation of emulsifiable oil-based compositions comprising more than 40 and up to 80 wt % of an oil phase and a suspended drift-control agent, provided that the compositions also contain the above combination of alkylbenzene sulfonate and alkyl, aryl or alkylaryl ether phosphate.

Preferably, the ethoxylated esteramines of formula I are those wherein n is from 2 to 5, even more preferably from 2 to 4, R''' is a saturated or unsaturated $C_{16}$-$C_{22}$ alkyl group and, when one among X, Y or Z is O—(CH$_2$CH$_2$O)$_n$—COR''', the other two substituents are both O—(CH$_2$CH$_2$O)$_n$H, when one among X, Y or Z is O—COR''', the other two substituents are both O—(CH$_2$CH$_2$O)$_n$H.

According to the invention, the ethoxylated esteramines of formula I are the reaction product of the esterification of a saturated or unsaturated $C_6$-$C_{30}$ aliphatic monocarboxylic acid with a tertiary hydroxylamine, the ethoxylation being conducted directly on the tertiary hydroxylamine before the esterification or on the product of the esterification reaction.

Examples of suitable $C_6$-$C_{30}$ aliphatic unsaturated monocarboxylic acids include both unsaturated and polyunsaturated aliphatic carboxylic acids with from 6 to 30 carbon atoms. Examples of these acids are palmitoleic acid, oleic acid, linoleic acid, linolenic acid, arachidonic acid, and the like.

Examples of $C_6$-$C_{30}$ aliphatic saturated monocarboxylic acids include decanoic acid, lauric acid, myristic acid, palmitic acid, stearic acid, behenic acid, and the like.

Mixtures of $C_6$-$C_{30}$ saturated and unsaturated aliphatic monocarboxylic acids can be also used.

Vegetable oils, even if recycled, i.e. derived from the purification of waste vegetable oils, are useful sources of mixtures of $C_6$-$C_{30}$ saturated and unsaturated aliphatic monocarboxylic acids that can be used in the preparation of the ethoxylated esteramines of formula I.

Mixtures of monocarboxylic acids derived from coconut oil, mustard seed oil, palm oil, olein, soy oil, canola oil, tall oil, sunflower oil and mixture thereof are preferred.

Mixtures of monocarboxylic acids derived from tall oil (tall oil fatty acids) are particularly preferred for the preparation of the ethoxylated esteramines of formula I; in particular, the most preferred tall oil fatty acids are those having a rosin acids content less than 6 wt %, preferably less than 2 wt %.

Mixtures of saturated and unsaturated aliphatic $C_6$-$C_{30}$ monocarboxylic acids obtained as by-products in the process of the biodiesel production are also suitable.

Tertiary hydroxylamines that are useful for the preparation of the ethoxylated esteramines of formula I are trialkanolamines, monoalkyldialkanolamines and dialkylmonoalkanolamines, wherein the alkyl and hydroxyalkyl substituents have from 1 to 8 carbon atoms.

Specific examples of said tertiary hydroxylamines are triethanolamine, N-methyl-diethanolamine, N-ethyl-diethanolamine, N-propyl-diethanolamine, N-butyl-diethanolamine, N,N-dimethyl-ethanolamine, N,N-diethyl-ethanolamine, N,N-diisopropyl-ethanolamine, N, N-dibutyl-ethanolamine and N, N-dimethyl-isopropanolamine.

Preferably, the tertiary hydroxylamine is a trialkanolamine, i.e. X, Y and Z in formula I are different from hydrogen. The most preferred trialkanolamine is triethanolamine, i.e. R, R' and R" in formula I are an alkylene group having 2 carbon atoms.

As stated above, the ethoxylated esteramines of the invention are the reaction product of the esterification of a saturated or unsaturated $C_6$-$C_{30}$ aliphatic monocarboxylic acid with a tertiary hydroxylamine, the ethoxylation being conducted directly on the tertiary hydroxylamine before the esterification (in formula I one of X, Y and Z is O—$(CH_2CH_2O)_n$—COR''') or on the product of the esterification reaction (in formula I one of X, Y and Z is O—COR'''). Preferably, the tertiary hydroxylamine undergoes ethoxylation and then is esterified with a saturated or unsaturated $C_6$-$C_{30}$ aliphatic monocarboxylic acid, by reacting them in a molar ratio of about 1:1.

Ethoxylated esteramines having formula I in which R, R' and R" are an alkylene group having 2 carbon atoms, X, Y and Z are O—$(CH_2CH_2O)_n$H or O—$(CH_2CH_2O)_n$—COR''', one of X, Y and Z is O—$(CH_2CH_2O)_n$—COR''' and n=2-5 are especially preferred.

In the oil-based drift control composition, suitable alkylbenzene sulfonates are typically branched or linear, preferably linear, $C_6$-$C_{18}$ alkylbenzene sulfonates; dodecylbenzene sulfonate is particularly preferred; they may be potassium, calcium, ammonium or alkylammonium salts. Other salts may be used.

In the preparation of the oil-based drift control composition, alkylbenzene sulfonic acid may be used as a precursor of the alkylbenzene sulfonates.

In the oil-based drift control composition, the alkyl, aryl or alkylaryl ether phosphate is preferably ethoxylated; more preferably it is an ethoxylated tristyrylphenol phosphate ester, in acid or salt form, by way of example a sodium, potassium, lithium, calcium, magnesium, ammonium or ($C_1$-$C_6$)alkyl ammonium salt. The ethoxylated tristyrylphenol phosphate ester is ethoxylated preferably with from 1 to 50, more preferably from 5 to 25, most preferably from 8 to 22 moles of ethylene oxide.

Optionally, the oil-based drift control compositions of the invention contain from 0.5 to 5 wt % of one or more thickening agents, such as silica, fumed silica or water-swellable clays, such as bentonite, montmorillonite, kaolinite, hectorite, attapulgite or smectite.

The oil-based drift control compositions of the invention may further contain, and preferably contains, from 0.5 to 15 wt % of water soluble organic solvents, such as glycerol, ethylene glycol, propylene glycol, diethylene glycol monobutyl ether, dipropylene glycol methyl ether (Dowanol DPM), dipropylene glycol, butyldiglycol, dimethylsulfoxide (DMSO), N-methyl-2-pyrrolidone, dibutoxymethane (Butylal), methanol, ethanol, isopropanol, ethyl lactate (Purasolv), propylene carbonate and mixtures thereof; diethylene glycol monobutyl ether is preferred.

The oil-based drift control compositions may be prepare by mixing their ingredients in any order.

Advantageously, they are prepared by first mixing the oil phase, the optional water soluble organic solvent and the optional thickening agent to homogenization, followed by the addition of the water soluble polymer and other nonionic ingredients and finally by the addition of the anionic ingredients and the optional water, under stirring. The pH is in case adjusted to neutrality by using an aqueous solution of a base (typically NaOH or KOH) and the system is further kept under mixing until homogenization.

The invention also relates to a method for reducing spray drift during spray application of a pesticide or crop protection formulation which comprises tank mixing the formulation with the oil-based drift control composition of the invention.

When the formulation to be sprayed is a crop protection formulation, in some embodiments, it is a fertilizing formulation containing as the fertilizer, by way of example: ammonia salts, such as ammonium sulfate, ammonium bisulfate, ammonium salts of carboxylic acids, ammonium chloride, ammonium carbonate, ammonium phosphate; urea and urea derivatives; phosphate sources, such as phosphoric acid and salts thereof; potash sources, like potassium phosphate (mono- or di-), potassium carbonate, potassium citrate, potassium nitrate; compounds containing micronutrients and secondary nutrients like zinc, manganese, magnesium, iron, calcium, sulfur, boron, etc.; and mixture thereof.

When the formulation is a pesticide formulation, in some embodiments it is desirably an herbicide formulation, containing one or more herbicides as the active substance. Said herbicides include: Acetochlor, Acibenzolar, Acibenzolar-S-methyl, Acifluorfen, Acifluorfen-sodium, Aclonifen, Alachlor, Allidochlor, Alloxydim, Alloxydim-sodium, Ametryn, Amicarbazone, Amidochlor, Amidosulfuron, Aminocyclopyrachlor, Aminopyralid, Amitrole, Ammonium sulfamat, Ancymidol, Anilofos, Asulam, Atrazine, Azafenidin, Azimsulfuron, Aziprotryn, Beflubutamid, Benazolin, Benazolin-ethyl, Bencarbazone, Benfluralin, Benfuresate, Bensulide, Bensulfuron, Bensulfuron-methyl, Bentazone, Benzfendizone, Benzobicyclon, Benzofenap, Benzofluor, Benzoylprop, Bicyclopyrone, Bifenox, Bispyribac, Bispyribac-sodium, Bromacil, Bromobutide, Bromofenoxim, Bromoxynil, Bromuron, Buminafos, Busoxinone, Butachlor, Butafenacil, Butamifos, Butenachlor, Butralin, Butroxydim, Butylate, Cafenstrole, Carbetamide, Carfentrazone, Carfentrazone-ethyl, Chlomethoxyfen, Chloramben, Chlorazifop, Chlorazifop-butyl, Chlorbromuron, Chlorbufam, Chlorfenac, Chlorfenac-sodium, Chlorfenprop, Chlorflurenol, Chlorflurenol-methyl, Chloridazon, Chlorimuron, Chlorimuron-ethyl, Chlormequat-chloride, Chlornitrofen, Chlorophthalim, Chlorthal-dimethyl, Chlorotoluron, Chlorsulfuron, Cinidon, Cinidon-ethyl, Cinmethylin, Cinosulfuron, Clethodim (C10), Clodinafop, Clodinafop-propargyl, Clofencet, Clomazone, Clomeprop, Cloprop, Clopyralid (C1), Cloransulam, Cloransulam-methyl, Cumyluron, Cyanamide, Cyanazine, Cyclanilide, Cycloate, Cyclosulfamuron, Cycloxydim (C11), Cycluron, Cyhalofop, Cyhalofop-butyl, Cyperquat, Cyprazine, Cyprazole, 2,4-D (i.e. acid, salts or esters thereof such as 2,4-D-butotyl, 2,4-D-butyl, 2,4-D-dimethylammonium, 2,4-D-diolamine, 2,4-D-ethyl, 2,4-D-ethylhexyl, 2,4-D-isobutyl, 2,4-D-isoctyl, 2,4-D-isopropyl, 2,4-D-isopropylammonium, 2,4-D-sodium, 2,4-D-triisopropanolammonium, 2,4-D-trolamine), 2,4-DB, Dalapon, Daminozide, Dazomet, n-Decanol, Desmedipham, Desmetryn, Detosyl-Pyrazolate (DTP), Diallate, Dicamba (i.e. acid, salts or esters thereof such as Dicamba-butotyl, Dicamba diglycolamine salt, Dicamba-dimethylammonium, Dicamba-diolamine, Dicamba-isopropylammonium, Dicamba-potassium, Dicamba-sodium, Dicamba-trolamine), Dichlobenil, Dichlorprop, Dichlorprop-P, Diclofop, Diclofop-methyl, Diclofop-P-methyl, Diclosulam, Diethatyl, Diethatyl-ethyl, Difenoxuron, Difenzoquat, Diflufenican, Diflufenzopyr, Diflufenzopyr-sodium, Dimefuron, Dikegulac-sodium, Dimefuron, Dimepiperate, Dimethachlor (C2), Dimethametryn, Dimethenamid, Dimethenamid-P, Dimethipin, Dimetrasulfuron, Dinitramine, Dinoseb, Dinoterb, Diphenamid, Dipropetryn, Diquat, Diquat-dibromide, Dithiopyr, Diuron, DNOC, Eglinazine-ethyl, Endothal, EPTC, Esprocarb, Ethalfluralin, Ethametsulfuron, Ethametsulfuron-methyl, Ethephon, Ethidimuron, Ethiozin, Ethofumesate, Ethoxyfen, Ethoxyfen-ethyl, Ethoxysulfuron, Etobenzanid, F-5331, i.e. N-[2-Chloro-4-fluoro-5-[4-(3-fluoropropyl)-4,5-dihydro-5-oxo-1H-tetrazol-1-yl]-phenyl]-ethan sulfonamide, F-7967, i.e. 3-[7-Chloro-5-fluoro-2-(trifluoromethyl)-1H-benzimidazol-4-yl]-1-methyl-6-(trifluoromethyl)pyrimidin-2,4(1H,3H)-dione, Fenoprop, Fenoxaprop, Fenoxaprop-P, Fenoxaprop-ethyl, Fenoxaprop-P-ethyl (C3), Fenoxasulfone, Fentrazamide, Fenuron, Flamprop, Flamprop-M-isopropyl, Flamprop-M-methyl, Flazasulfuron, Florasulam, Fluazifop, Fluazifop-P, Fluazifop-butyl, Fluazifop-P-butyl, Fluazolate, Flucarbazone, Flucarbazone-sodium, Flucetosulfuron, Fluchloralin, Flufenacet (Thiafluamide), Flufenpyr, Flufenpyr-ethyl, Flumetralin, Flumetsulam, Flumiclorac, Flumiclorac-pentyl, Flumioxazin, Flumipropyn, Fluometuron, Fluorodifen, Fluoroglycofen, Fluoroglycofen-ethyl, Flupoxam, Flupropacil, Flupropanate, Flupyrsulfuron, Flupyrsulfuron-methyl-sodium, Flurenol, Flurenol-butyl, Fluridone, Flurochloridone, Fluroxypyr, Fluroxypyr-meptyl, Flurprimidol, Flurtamone, Fluthiacet, Fluthiacet-methyl, Fluthiamide, Fomesafen, Foramsulfuron, Forchlorfenuron, Fosamine, Furyloxyfen, Glufosinate (i.e. acid and salts thereof, such as Glufosinate-ammonium), Glyphosate (i.e. acid and salts thereof, such as Glyphosate-diammonium, Glyphosate-isopropylammonium, Glyphosate-potassium), H-9201, i.e. O-(2,4-Dimethyl-6-nitrophenyl)-O-ethyl-isopropyl phosphoramidothioate, Halosafen, Halosulfuron, Halosulfuron-methyl, Haloxyfop, Haloxyfop-p (C4), Haloxyfop-ethoxyethyl, Haloxyfop-P-ethoxyethyl, Haloxyfop-methyl, Haloxyfop-P-methyl, Hexazinone, HW-02, i.e. 1-(Dimethoxyphosphoryl)-ethyl(2,4-dichlorophenoxy)acetate, Imazamethabenz, Imazamethabenz-methyl, Imazamox (C9), Imazamox-ammonium, Imazapic, Imazapyr, Imazapyr-isopropylammonium, Imazaquin, Imazaquin-ammonium, Imazethapyr, Imazethapyr-ammonium, Imazosulfuron, Inabenfide, Indanofan, Indaziflam, Indolacetic acid (IAA), 4-Indol-3-yl-butirric acid (IBA), Iodosulfuron, Iodosulfuron-methyl-sodium, Ioxynil, Ipfencarbazone, Isocarbamid, Isopropalin, Isoproturon, Isouron, Isoxaben, Isoxachlortole, Isoxaflutole, Isoxapyrifop, KUH-043, i.e. 3-({[5-(Difluoromethyl)-1-methyl-3-(trifluoromethyl)-1H-pyrazol-4-yl]methyl}sulfonyl)-5,5-dimethyl-4,5-dihydro-1,2-oxazole, Karbutilate, Ketospiradox, Lactofen, Lenacil, Linuron, MCPA, MCPB, MCPB-methyl, -ethyl and -sodium, Mecoprop, Mecoprop-sodium, Mecoprop-butotyl, Mecoprop-P-butotyl, Mecoprop-P-dimethylammonium, Mecoprop-P-2-ethylhexyl, Mecoprop-P-potassium, Mefenacet, Mefluidide, Mepiquat-chlorid, Mesosulfuron, Mesosulfuron-methyl, Mesosulfuron-methyl-Na, Mesotrione, Methabenzthiazuron, Metam, Metamifop, Metamitron, Metazachlor (C5), Metazasulfuron, Methazole, Methiopyrsulfuron, Methiozolin, Methoxyphenone, Methyldymron, 1-Methylcyclopropen, Methylisothiocyanat, Metobenzuron, Metobromuron, Metolachlor, S-Metolachlor, Metosulam, Metoxuron, Metribuzin, Metsulfuron, Metsulfuron-methyl, Molinate, Monalide, Monocarbamide, Monocarbamide-dihydrogensulfat, Monolinuron, Monosulfuron, Monosulfuron-ester, Monuron, MT-128, i.e. 6-Chloro-N-[(2E)-3-chloroprop-2-en-1-yl]-5-methyl-N-phenylpyridazin-3-amine, MT-5950, i.e. N-[3-Chloro-4-(1-methylethyl)-phenyl]-2-methylpentanamide, NGGC-011, Naproanilide, Napropamide (C6), Naptalam, NC-310, i.e. 4-(2,4-Dichlorobenzoyl)-1-methyl-5-benzyloxypyrazole, Neburon, Nicosulfuron, Nipyraclofen, Nitralin, Nitrofen, Nitrophenolat-sodium (isomer mixture), Nitrofluorfen, Nonansäure, Norflurazon, Orbencarb, Orthosulfamuron, Oryzalin, Oxadiargyl, Oxadiazon, Oxasulfuron, Oxaziclomefone, Oxyfluorfen, Paclobutrazol, Paraquat, Paraquat-dichlorid, Pendimethalin, Pendralin, Penoxsulam, Pentanochlor, Pentoxazone, Perfluidone, Pethoxamid, Phenisopham, Phenmedipham, Phenmedipham-ethyl, Picloram, Picolinafen, Pinoxaden, Piperophos, Pirifenop, Pirifenop-butyl, Pretilachlor, Primisulfuron, Primisulfuron-methyl, Probenazole, Profluazol, Procyazine, Prodiamine, Prifluraline, Profoxydim, Prohexadione, Prohexadione-calcium, Prohydrojasmone, Prometon, Prometryn, Propachlor, Propanil, Propaquizafop, Propazine, Propham, Propisochlor, Propoxycarbazone, Propoxycarbazone-sodium, Propyrisulfuron, Propyzamide, Prosulfalin, Prosulfocarb, Prosulfuron, Prynachlor, Pyraclonil, Pyraflufen, Pyraflufen-ethyl, Pyrasulfotole, Pyrazolynate (Pyrazolate), Pyrazosulfuron, Pyrazosulfuron-ethyl, Pyrazoxyfen, Pyribambenz, Pyribambenz-isopropyl, Pyribambenz-propyl, Pyribenzoxim, Pyributicarb, Pyridafol, Pyridate (C7), Pyriftalid, Pyriminobac, Pyriminobac-methyl, Pyrimisulfan, Pyrithiobac, Pyrithiobac-sodium, Pyroxasulfone, Pyroxsulam, Quinclorac, Quinmerac, Quinoclamine, Quizalofop, Quizalofop-ethyl, Quizalofop-P, Quizalofop-P-ethyl, Quizalofop-P-tefuryl, Rimsulfuron, Saflufenacil, Secbumeton, Sethoxydim, Siduron, Simazine, Simetryn, SN-106279, i.e. Methyl-(2R)-2-({7-[2-chloro-4-(trifluoromethyl)phenoxy]-2-naphthyl}oxy) propanoate, Sulcotrione, Sulfallate (CDEC), Sulfentrazone, Sulfonneturon, Sulfonneturon-methyl, Sulfosate (Glyphosate-trimesium), Sulfosulfuron, SYN-523, SYP-249, i.e. 1-Ethoxy-3-methyl-1-oxobut-3-en-2-yl-5-[2-chloro-4-(trifluoromethyl)phenoxy]-2-nitrobenzoate, SYP-300, i.e. 1-[7-Fluoro-3-oxo-4-(prop-2-in-1-yl)-3,4-dihydro-2H-1,4-benzoxazin-6-yl]-3-propyl-2-thioxoimidazolidin-4,5-dione, Tebutam, Tebuthiuron, Tecnazene, Tefuryltrione, Tembotrione, Tepraloxydim, Terbacil, Terbucarb, Terbuchlor, Terbumeton, Terbuthylazine, Terbutryn, Thenylchlor, Thiafluamide, Thiazafluron, Thiazopyr, Thidiazimin, Thidiazuron, Thiencarbazone, Thiencarbazone-methyl, Thifensulfuron, Thifensulfuron-methyl, Thiobencarb, Tiocarbazil, Topramezone, Tralkoxydim, Triallate, Triasulfuron, Triaziflam, Triazofenamide, Tribenuron, Tribenuron-methyl, Trichloroacetic acid (TCA), Triclopyr, Tridiphane, Trietazine, Trifloxysulfuron, Trifloxysulfuron-sodium, Trifluralin (C8), Triflusulfuron, Triflusulfuron-methyl, Trimeturon, Trinexapac, Trinexapac-ethyl, Tritosulfuron, Tsitodef, Uniconazole, Uniconazole-P, Vernolate, ZJ-0862, i.e. 3,4-Dichloro-N-{2-[(4,6-dimethoxypyrimidin-2-yl)oxy]benzyl}aniline, salts thereof and mixture thereof.

According to a preferred embodiment, the invention relates to a method for reducing spray drift during spray application of a pesticide or crop protection formulation which comprises tank mixing the formulation with the oil-based drift control composition of the invention, wherein the pesticide or crop protection tank formulation is a pesticide composition and comprises a herbicide active substance selected among Glyphosate, Glufosinate, Paraquat, 2,4-D, Dicamba, Clethodim, Imazapyr, Imazetapyr, Metribuzion, Mesotrione or mixtures thereof; according to a more preferred embodiment, the herbicide active substance is selected among Glyphosate, Glufosinate, 2,4-D, Dicamba, Clethodim, or mixtures thereof.

When the herbicide active substance is a mixture, preferably it is a mixture of Clethodim and Dicamba, or a mixture of Dicamba and Glyphosate, or a mixture of Glyphosate and 2,4-D.

The pesticide or crop protection formulations of the method are aqueous diluted formulations that can be sprayed on the fields. For the purposes of this application, the term "diluted" means that the formulations have an active substance(s) concentration of from about 0.001 to about 50 g/l.

The pesticide or crop protection formulations of the method may optionally contain one or more additional ingredients known in the art, such as water conditioners, chelating agents, antioxidants, antifoam agents, fillers, wetting agents, dispersing agents, spreading agents, pH adjusting agents, binding agents, stabilizers, organic solvents, antifreeze agents, penetrants, bioactivators or compatibilizing agents.

Water typically represents at least 90% by weight of the aqueous diluted formulations. The pesticide or crop protection formulations are usually prepared in loco by the farmer or contractor by mixing concentrated pesticide formulations of active substances (that can be in various forms, for instance liquids or powders, granules, aqueous solutions, concentrated suspensions, concentrated emulsions, suspoemulsions or the like), water and the additional ingredients, mixed with the oil based-drift control composition and applied on the field.

The method of the invention does not require special spraying devices and the final formulations may be applied on the target area using any conventional spray equipment for aerial or ground applications.

EXAMPLES

The oil-based drift control compositions of the examples were prepared by using the following components in the amounts reported in Table 1:
SME=soy oil methyl esters
CME=canola oil methyl esters
Barage®I 24=thickening agent from Elementis PLC
Glycol ether DB=diethylene glycol monobutyl ether TAK1=20 moles ethoxylated triethanolamine, monoester with tall oil fatty acids, prepared following the procedure of Example 2 of WO2019038102 (ethoxylated esteramine)
TAK2=10 moles ethoxylated triethanolamine, monoester with tall oil fatty acids, prepared following the procedure of Example 2 of WO2019038102 (ethoxylated esteramine)
CaDDBS=dodecylbenzene sulfonate calcium salt
IPADDBS=dodecylbenzene sulfonate isopropylamine salt
DDBSA=dodecylbenzene sulfonic acid
TRSA=ethoxylated tristyrylphenol phosphate
iC13(8EO)=8 moles ethoxylated isotridecyl alcohol
iC13(6EO)=6 moles ethoxylated isotridecyl alcohol
COO(18EO)=18 moles ethoxylated castor oil oleate
CO(EO)=ethoxylated castor oil
Sorbitan MO(EO)=ethoxylated sorbitan monoleate
NP(EO)=ethoxylated nonylphenol
iC10(EO)=ethoxylated isodecyl alcohol 10 moles
TSPEO=ethoxylated tristyrylphenol
Reax® 907=lignosulfonate from Ingevity Preparation of the Oil-Based Drift Control Compositions A first portion of oil phase was added to a dry vessel and then the vessel was transferred to a Silverson L4R mixer. Diethylene glycol monobutyl ether was added and the system was allowed to homogenize under stirring. The thickening agent was added and the mixture was kept under shearing for 20 minutes. The remaining portion of oil methyl ester was added and the system was allowed to homogenize.

The vessel was transferred to an IKA mechanical mixer for medium speed kinetic mixing (850 rpm). Under mixing guar gum and the other nonionic ingredients were added, followed by the anionic ingredients and water. Once the system was homogenized, the ph was in case adjusted to 7.4-7.7 by using an aqueous solution of KOH. Finally, the system was kept under mixing for 20 minutes.

Emulsion Stability Test

The suitability of the oil-based drift control compositions of the invention for the use in diluted sprayable herbicide compositions (tank mixes) was evaluated by conducting an emulsion stability test. Said test was performed according to the standard method ASTM E1116-98 (2008).

The tested oil-based drift control compositions were diluted with hard water (342 ppm) at 1 wt % dilution.

The emulsion stability was also assessed in the presence of a water conditioner (addition of 1% by weight of AMS, ammonium sulfate) and in neutral water (pH7).

The emulsions are considered stable when no phase separation and less than 3% of cream at the top of the emulsion are observed.

Dispersibility Test

In a 1 liter container, filled with 990 g cool tap water, 10 g of the drift control composition are added.

The container is placed on ring stand and the propeller-shaped blade of a mixer is lowered into the container to the 500 ml mark.

The stirring speed is set at 500 rpm, and stirring is stopping every 30 seconds to evaluate for homogeneity.

Test stops either once all material is incorporated or when 180 seconds have passed without full incorporation of material. Ideal dispersibility time is 60 sec or less.

The results of the emulsion stability and dispersibility tests are reported in Table 2.

Table 3 reports the chemical-physical characteristics of the compositions that showed good emulsion stability.

TABLE 1

Oil-based drift control compositions

| Ingredient | Ex 1 | Ex 2 | Ex 3 | Ex 4 | Ex C1* | Ex C2* | Ex C3* | Ex C4* | Ex C5* |
|---|---|---|---|---|---|---|---|---|---|
| | | | | | wt % | | | | |
| SME | 58 | 58 | | | 59 | 59 | 59 | 57 | 58 |
| CME | | | 58 | 58 | | | | | |
| Baragel ® 24 | 3 | 3 | 3 | 3 | 2.5 | 2.5 | 2.5 | 3 | 3 |
| Glycol Ether DB | 9.3 | 9.3 | 9.3 | 7.3 | 1.5 | 1.5 | 1.5 | 10.5 | 9.5 |
| TAK2 | 13 | 14 | 14 | | | | | | 12 |
| TAK1 | | | | 10 | | | | | |
| CaDDBS | 5.5 | | | | | | | | |
| DDBSA | | | | 10 | | | | | 5.5 |
| IPADDBS | | 4.5 | 4.5 | | | | | | |
| TRSA | 2 | 2 | 2 | 2.3 | 2 | 2 | 1.4 | 2 | |
| iC13(8EO) | | | | | | | | 10.5 | |
| iC13(6EO) | | | | | 10.5 | | | | |
| COO(18EO) | | | | | | 8 | | 8 | |
| CO(EO) | | | | | 8 | | | | |
| Sorbitan MO (EO) | | | | | | 10.5 | | | |
| NP(EO) | | | | | | | 9.7 | | |
| iC10(EO) | | | | | | | 8.2 | | |
| TSPEO | | | | | | | | | 1.5 |
| Reax ® 907 | | | | | | | | | 1.5 |
| WSP** | 7 | 7 | 7 | 7.1 | 5 | 5 | 5 | 5 | 7 |
| Water | 2.2 | 2.2 | 2.2 | 2.3 | 11.5 | 11.5 | 12.7 | 4 | 2 |

*comparative
**water soluble polymer

TABLE 2

Emulsion stability and dispersibility tests

| | Ex 1 | Ex 2 | Ex 3 | Ex 4 | Ex C1* | Ex C2* | Ex C3* | Ex C4* | Ex C5* |
|---|---|---|---|---|---|---|---|---|---|
| | Emulsion stability | | | | | | | | |
| 324 ppm water | yes | yes | yes | yes | no | no | no | yes | yes |
| 1% AMS | yes | yes | yes | yes | no | no | no | yes | yes |
| water | yes | yes | yes | yes | nd** | nd** | nd** | yes | yes |
| | Dispersibility (in seconds) | | | | | | | | |
| | 60 | 45 | 45 | 30 | nd** | nd** | nd** | 70 | 180 |

*comparative
**not determined

TABLE 3

Chemical physical characteristics

| | Ex 1 | Ex 2 | Ex 3 | Ex 4 | Ex C4* | Ex C5* |
|---|---|---|---|---|---|---|
| SF (EV @0.75% in CIPAC D) | 1.52 | 1.51 | 1.61 | 1.40 | 1.18 | 1.5 |
| Storage stability (54° C., 14 d)* | 2 | 3 | 2 | 1 | 4 | 9 |
| pH | 7.56 | 7.44 | 7.53 | 7.66 | 4.51 | 7.64 |
| d (kg/l) | 0.983 | 0.959 | 0.960 | 0.966 | 0.944 | 0.999 |
| Appearance | hom. | hom. | hom. | hom. | foamy gel | foamy gel |
| BV (spindle 3, 20 rpm) | 6900 | 1400 | 2000 | 2400 | 440 | 3500 |

*comparative
Legend:
EV = Elongational Viscosity
SF = Screen Factor (acceptable if in the range 1.40-1.65)
*expressed as separation vol % (acceptable when <5)
14 d = after 14 days
D = density
hom. = homogeneous
BV = Brookfield ® viscosity Compatibility Tests in Herbicide Formulations Sprayable herbicide formulations were prepared by diluting 1 wt % of the oil-based drift control compositions of the Examples 1-4, C4 and C5 in the herbicides formulations reported in Table 4.

The compatibility is visually ranked as follows:

| | |
|---|---|
| OK | very good |
| + | good |
| ++ | acceptable |
| +++ | acceptable only under stirring |
| ++++ | poor stability |
| +++++ | unstable |

TABLE 4

| | Compatibility | | | | | |
|---|---|---|---|---|---|---|
| | Ex 1 | Ex 2 | Ex 3 | Ex 4 | Ex C4* | Ex C5* |
| 1.6% RuPM | ok | ok | + | ok | ++ | + |
| 1% Xtendimax ® | ok | ++ | +++ | ok | ++ | + |
| 0.5% SelectMax ® | + | +++ | +++ | + | ++++ | ++++ |
| 1% Radar ®LV400 | ok | + | ++ | ok | ++++ | + |
| 2% Liberty ® | ok | ok | ok | ok | + | ok |

*comparative

RuPM is Roundup® Power Max, a potassium glyphosate based herbicide, commercially available from Bayer CropScience.

Xtendimax® is a Dicamba diglycolamine salt based herbicide, commercially available from Bayer CropScience.

Select Max® is a Clethodim based herbicide, commercially available from Bayer CropScience.

Radar® LV400 is a 2,4-D 2-Ethylhexyl Ester based herbicide, commercially available from Growmark Inc.

Liberty® is a Glufosinate-ammonium based herbicide, commercially available from BASF.

The invention claimed is:

1. An oil-based drift control composition consisting of:

a) from 40 to 80% by weight (wt %) of an oil phase;

b) from 1 to 15 wt % of a water soluble polymer as drift reducing agent;

c) from 5 to 20 wt % of at least one ethoxylated esteramine of formula I:

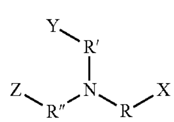

I wherein:

R, R' and R" are each independently alkylene group having from 1 to 8 carbon atoms;

X, Y and Z are selected among H, $O—(CH_2CH_2O)_nH$, $O—(CH_2CH_2O)_n$-COR''' or O—COR''' and one of X, Y and Z is $O—(CH_2CH_2O)_n$-COR''' or O-COR''';

wherein n=1-10;

R''' is a saturated or unsaturated $C_6$-$C_{30}$ alkyl group, provided that:

i) when one among X, Y or Z is $O—(CH_2CH_2O)_n$COR''', the other two substituents are each independently H or $O—(CH_2CH_2O)_nH$— ii) when one among X, Y or Z is O—COR''', the other two substituents are H or $O—(CH_2CH_2O)_nH$ and at least one of them is $O—(CH_2CH_2O)_nH$;

d) from 3 to 10 wt % of at least one alkylbenzene sulfonate;

e) from 0.5 to 5 wt % of at least one alkyl, aryl or alkylaryl ether phosphate;

f) from 0 to 15 wt % of water;

g) from 0.5 to 5 wt % of a thickening agent; and h) from 0.5 to 15 wt % of a water soluble organic solvent.

2. The oil-based drift control composition of claim 1, wherein the oil phase is a vegetable oil or a transesterification product thereof with a $C_1$-$C_4$ alcohol.

3. The oil-based drift control composition of claim 2, wherein the oil phase is the transesterification product of a vegetable with methyl or ethyl alcohol.

4. The oil-based drift control composition of claim 3, wherein the oil phase is canola oil methyl ester or soybean oil methyl ester.

5. The oil-based drift control composition of claim 1, wherein the water soluble polymer is guar gum or hydroxypropyl guar.

6. The oil-based drift control composition of claim 5, wherein the water soluble polymer is guar gum.

7. The oil-based drift control composition of claim 1, wherein the ethoxylated esteramine has formula I in which R, R', and R" are an alkylene group having 2 carbon atoms, X, Y and Z are $O—(CH_2CH_2O)_nH$ or $O—(CH_2CH_2O)_n$—COR''', one of X, Y and Z is $O—(CH_2CH_2O)_n$—COR''' and n=2-5.

8. The oil-based drift control composition of claim 1 consisting of:

a) from 50 to 70 wt % of oil phase;

b) from 1.5 to 10 wt % of water soluble polymer as drift reducing agent;

c) from 10 to 15 wt % of at least one ethoxylated esteramine of formula I;

d) from 3 to 8 wt % of at least one alkylbenzene sulfonate;

e) from 1 to 3 wt % of at least one alkyl, aryl or alkylaryl ether phosphate; and f) from 0 to 9 wt % of water.

* * * * *